United States Patent
Geaugey et al.

(10) Patent No.: US 6,505,744 B1
(45) Date of Patent: Jan. 14, 2003

(54) SOLID-LIQUID SEPARATION EQUIPMENT IN PARTICULAR FOR BIOLOGICAL PURIFICATION OF WASTEWATER

(75) Inventors: Valérie Geaugey, Maule (FR); Catherine Duval, Corbeil Essones (FR); Franck Le Bars, Bougival (FR)

(73) Assignees: Suez Lyonnaise Des Eaux, Nanterre Cedex (FR); Degremont, Reuil Malmaison (FR)

( * ) Notice: Subject to any disclaimer, the term of this patent is extended or adjusted under 35 U.S.C. 154(b) by 0 days.

(21) Appl. No.: 09/646,266

(22) PCT Filed: Apr. 19, 1999

(86) PCT No.: PCT/FR99/00094

§ 371 (c)(1),
(2), (4) Date: Sep. 15, 2000

(87) PCT Pub. No.: WO99/47233

PCT Pub. Date: Sep. 23, 1999

(30) Foreign Application Priority Data

Mar. 16, 1998 (FR) .............................................. 98 03197

(51) Int. Cl.[7] .......................... B01D 29/66; B01D 29/62

(52) U.S. Cl. .................. 210/410; 210/154; 210/221.1; 210/221.2; 210/258; 210/409

(58) Field of Search .................................. 210/170, 154, 210/221.1, 221.2, 258, 409, 410, 521

(56) References Cited

FOREIGN PATENT DOCUMENTS

WO    WO 94/00217    *   1/1994

* cited by examiner

*Primary Examiner*—John Kim
(74) *Attorney, Agent, or Firm*—Connolly Bove Lodge & Hutz LLP

(57) ABSTRACT

An apparatus for the separation of a solid/liquid suspension by filtration includes a tank filled with a suspension to be treated. At least one cavitied plate is located in the tank and has at least one internal cavity. The plate is immersed in the suspension to be treated. The plate is inclined with respect to the vertical and only a lower inclined face of the plate is covered with a filter medium, the upper face being solid. The compartment of the cavitied plate communicates with a conduit which collects filtered suspension. Gas flushing pipes are positioned below the plate for emitting gas bubbles that pass across the filter medium and remove material clinging thereto.

23 Claims, 2 Drawing Sheets

SOLID-LIQUID SEPARATION EQUIPMENT IN PARTICULAR FOR BIOLOGICAL PURIFICATION OF WASTEWATER

FIELD OF THE INVENTION

The present invention relates to apparatuses for solid/liquid separation carried out by filtration on membrane or textile materials. More particularly, the invention relates to improvements made to filtration apparatuses of the above type, intended more specifically for the treatment of suspensions of sludge resulting from physico-chemical or biological purification operations (activated sludge, mixed liquors). It applies especially to the purification of wastewater by biological means.

BACKGROUND OF THE INVENTION

It is known that the biological purification of wastewater relies on the culturing of purifying bacteria in specific systems. The system most commonly used is activated sludge, that is to say a culture of these bacteria in suspension in treated water, usually called the mixed liquor. New systems, called mixed cultures, make use of this sludge, mixing it with a suspended medium material.

The effectiveness and the reliability of these systems rely on separation between this activated sludge and the treated water, this separation constituting clarification. At the present time, the clarification is in almost all cases achieved by settling, but in a few special cases by filtration.

The essential characteristics of these two known clarification techniques will be recalled below:

Secondary settling tanks or clarifiers are plants designed to separate the mixed liquor from the treated water by simple settling. The use of these clarifiers in wastewater treatment stations has two major limitations: firstly, the sludge concentration in the biological basin is limited to six grammes of dry matter per liter of mixed liquor, which translates to large plant volumes, and, secondly, it is necessary, if a nitrification step is carried out, to denitrify the effluent so as to prevent flotation of the sludge in the plant and consequently the leakage of suspended matter into the treated water.

Moreover, most existing stations are confronted with many problems which degrade the settlability of the sludge, especially the proliferation of filamentary bacteria causing expansion and foaming problems, variations in pH or in salinity, and influx of toxic products, which often result in the settling operation being seriously disturbed.

In short, malfunctions of clarifiers are a frequent occurrence and often result in dramatic leakage of sludge into the subsequent treatment steps or into the natural environment: this lack of reliability is therefore incompatible with the latest discharge standards.

In clarification by filtration, the filtration is carried out by ultrafiltration membranes (having pore sizes of generally between 0.001 and 0.1 $\mu$m) or microfiltration membranes (having a pore size of generally between 0.05 and 5 $\mu$m). These separation processes, when applied to the field of biological sludge filtration, are generally known by the name MBR (membrane bioreactors). In all these systems, energy is applied to the sludge, at the surface of the membrane, so as to limit membrane fouling and to increase the flow rates and/or the duration of the filtration.

A first type of MBR is characterized by the use of a membrane located outside the biological basin for performing the separation, thereby making it possible to apply a large amount of useful energy to the surface of the membrane. In this case, the sludge is made to flow at a high rate through the filter, tangentially to the membrane, so as to limit membrane fouling. The transfer pressure (TMP: transmembrane pressure) is between $0.5 \times 10^5$ Pa and $5 \times 10^5$ Pa. In this way, filtration outputs of about 50 to 200 l/h per m$^2$ of membrane are obtained. These outputs are maintained for periods of about 1 to 2 weeks before the membrane becomes clogged up, the latter then being chemically regenerated. The main limitation of these MBRs stems from the energy consumption associated with making the sludge flow through the filter. The high flow rates required entail in fact an electrical consumption of about 1 to 5 kWh per m$^3$ of water treated. For this reason, the field of application of these MBRs is limited to small-capacity plants and more particularly for highly contaminated effluents.

A second type of MBR is characterized by the fact that the filtration of the sludge is performed on membranes located within the biological basin. In this case, the filter is immersed directly in the biological basin, turbulence being created by aeration and/or stirring within the sludge to be filtered. The treated water is collected under gravity or by suction pumping through the membrane, which translates to transfer pressures of generally between $0.1 \times 10^5$ Pa and $10^5$ Pa. The level of energy applied to the surface of the membrane is lower than in the case of the first type of MBR described above, thereby making it possible to reduce the energy consumption. However, the outputs obtained are no more than about 5 to 50 liters per hour per m$^2$ of membrane. These low outputs therefore result in the use of large filter areas, the cost of which very greatly penalizes the process, especially for large-capacity plants and more particularly when the effluents are not highly concentrated.

Moreover, there are other filtration processes which combine high-output performance with low energy consumption but, to various degrees, these known processes prove to be unsuitable for the filtration of concentrated biological suspensions. These processes include frontal-filtration processes in which the filtration is carried out on a medium with coarse pores covered with a preformed prelayer (addition of a diatomaceous suspension, etc.) providing the actual separation (cartridge filters, etc.), such systems operating in a discontinuous manner, by "filtration/unclogging/prelayer formation" cycles. The filtration periods are characterized by a greater increase in the transfer pressure due to the build-up of matter on the surface of the prelayer and to the migration of fine particles into this layer. This pressure structures the deposition on the surface of the coarse filtration medium. When the pressure reaches a critical value of about $10^5$ Pa to $10^6$ Pa, the "prelayer+trapped particles" combination rendered coherent by the pressure is removed by a very vigorous washing operation using countercurrent water or air. Unfortunately, these processes are difficult to apply to the filtration of biological suspensions since these particles are usually highly compressible: when the suspensions are concentrated, the rapid growth of the deposit of particles on the surface of the filtration medium results in a dramatic increase in the hydraulic resistance, which in turn results in cessation of filtration.

In conclusion, the MBR filtration techniques constitute, for low-capacity plants, a satisfactory technical alternative to conventional settling-based clarification processes; on the other hand, their construction and/or running costs remain higher than those of the said conventional processes. For large capacities, greater than a few thousands of m$^3$ per day, there is at the present time no satisfactory solution. The present invention is specifically aimed at providing a solution to this problem.

BRIEF DESCRIPTION OF THE INVENTION

Consequently, the subject of the present invention is an apparatus for the separation of a solid/liquid suspension by filtration, especially of sludge from a biological or physico-chemical purification liquor, on a textile or membrane filter material, characterized in that it consists of at least one plate immersed in the suspension to be treated, the said plate being inclined with respect to the vertical and made in the form of a cavitied plate, comprising one or more compartments, only the lower face of which is covered with the filter medium, the upper face being solid, the internal volumes of the said plate being connected to a manifold or to a duct which gathers the treated water, and gas-flushing means are provided, these being positioned at a lower level than the filter medium so that the gas bubbles emitted by the said flushing means flow away along the filter medium.

According to one embodiment of this invention, the separation apparatus consists of several cavitied plates having one or more compartments, the said plates preferably being arranged parallel to each other. They may be equidistant from each other or separated from each other with a variable spacing.

According to the present invention, the treated water may be recovered by the said manifold or the said duct either at the top or side of the said plate or plates, or at the bottom of the latter, the latter method of operation preventing or at least limiting any deposit build-up.

According to a preferred embodiment of this separation apparatus, the said plate or plates is or are inclined at approximately 5 to 60 degrees with respect to the vertical. In the illustrative embodiment in which several plates are provided, the spacing of the latter is preferably between approximately 0.5 and 20 cm.

According to the present invention, the filter medium is preferably a coarse medium made of a membrane or textile material having a pore size of between 0.2 and 100 $\mu$m.

According to the present invention, the gas-flushing means may be produced in the form of an array of air diffusers placed beneath the filter membranes. These diffusers may be placed at the bottom of the biological basin or tank receiving the apparatus, and their orifices emerge under the filtration plate or plates or in the lower part of the said tank.

According to another embodiment of the invention, the gas-flushing means are incorporated into the said plate or plates, these means being made in the form of separate chambers which extend the lower part of each plate and are fed with gas via a feed pipe, each of the said chambers being provided with at least one discharge opening which is positioned so that the gas bubbles flow away along the filter medium of each plate.

According to the invention, the gas may be air, oxygen, ozonized gas or an inert gas and its flow rate is preferably about 0.05 to 10 m$^3$/h per linear meter of plate width.

According to the invention, the gas is injected continuously, discontinuously, periodically or randomly, at a constant or variable flow rate.

Further features and advantages of the present invention will emerge from the description given below with reference to the appended drawing which depicts two illustrative embodiments, these being devoid of any limiting character. In the drawing:

DETAILED DESCRIPTION OF THE INVENTION

As will have been understood from the above description, the invention consists in carrying out the filtration at low pressure (of between 10 and 10$^4$ Pa, preferably about 10$^2$ Pa) on a textile or membrane material. It will be noted that the filtration pressure is much less than the values used at the present time.

The principle upon which the invention is based consists in creating at the surface of the filter medium the hydraulic conditions that make it possible to maintain a layer of material of sufficiently small thickness in such a way that the transfer pressure remains low.

Thus, as mentioned above and as will be described in detail below, these hydraulic conditions are provided by means for flushing the layer of the filtration medium with gas.

Figure 1:
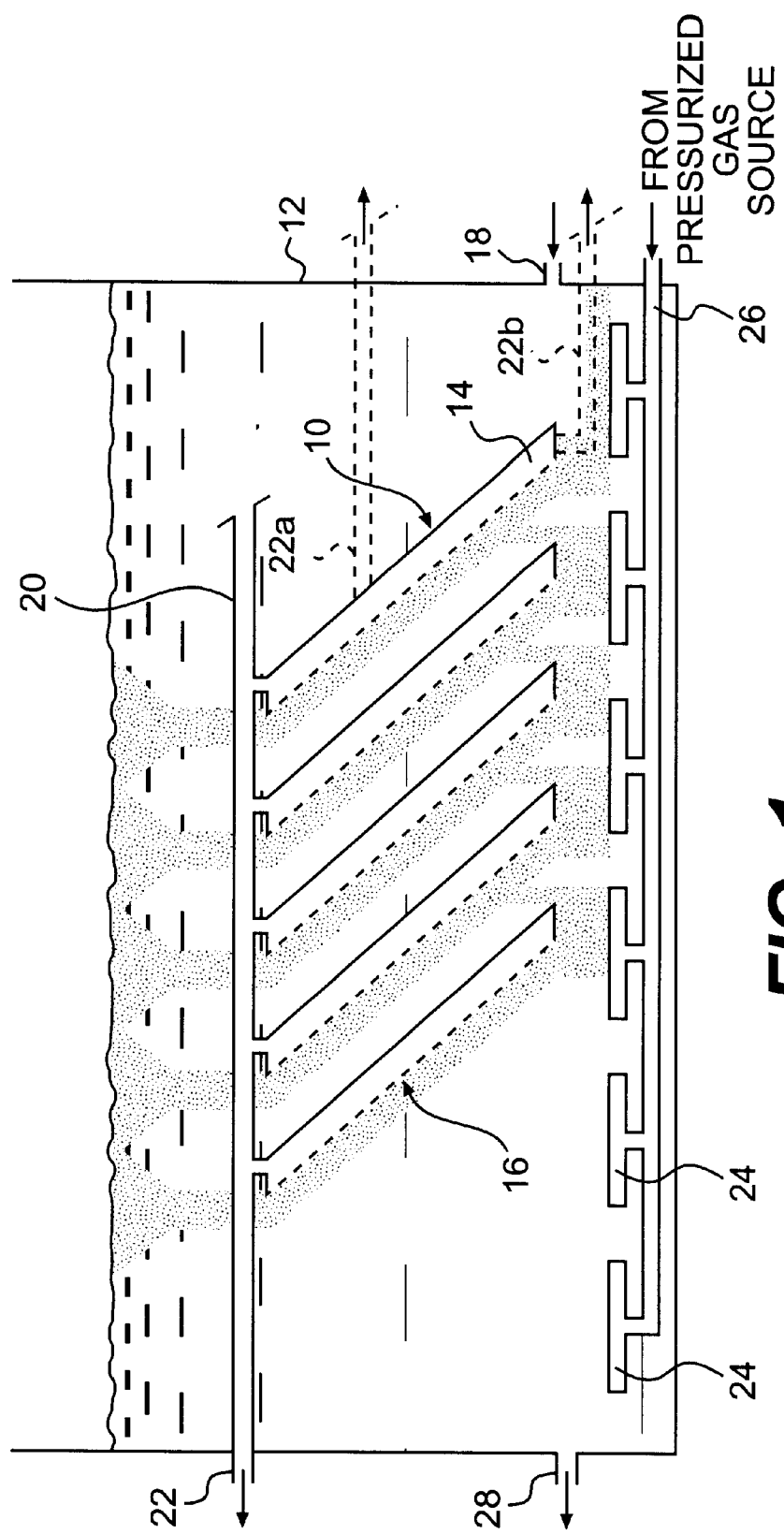
FIG. 1 is a schematic vertical sectional view showing a separation plant employing a first embodiment of the apparatus according to the present invention.

Reference will now be made to FIG. 1 which shows a first illustrative embodiment of the filtration apparatus forming the subject of the present invention. In this non-limiting illustrative embodiment, the apparatus comprises several plates.

This filtration apparatus, denoted in its entirety by the reference 10, is immersed in the tank 12 containing the suspension to be treated which is admitted at 18. This apparatus 10 consists here of a plurality of cavitied plates, such as 14, comprising one or more compartments, these plates being placed in the tank 12 in an inclined manner, preferably at an angel of 5 to 60 degrees to the vertical. In this non-limiting illustrative embodiment, the plates 14 are placed parallel to each other with a specific spacing, for example of between approximately 0.5 and 20 cm. In this illustrative embodiment, the plates 14 are equidistant: this is merely one example, the spacing between the plates possibly varying. The treated water, after being filtered through the plates 14, is collected by a duct 20 which, in this illustrative embodiment, is provided in the upper part of the tank 12, the treated water then being removed from the latter via the discharge orifice 22. Of course, without departing from the scope of the invention, the treated water may be recovered at any point in the filter module, that is to say from each plate 14, for example at the bottom 22b of the permeate-collecting chambers of the plates 14, thereby preventing or at least limiting any deposit build-up.

As a variant, the treated water may be recovered using a duct, especially in the side part of the said plate or plates (22a).

The concentrated sludge is discharged from the tank 12 via the discharge orifice 28.

Placed on the lower surface 16 of each of the plates 14 is the filtration medium produced in the form of a medium made of a membrane or textile material having a pore size of between 0.2 and 100 $\mu$m.

According to the present invention, in the non-limiting illustrative embodiment depicted in the drawing, the gas-flushing means are provided at the bottom of the tank 12, beneath the inclined plates such as 14, the gas bubbles emitted by these flushing means flowing away along the filter medium, that is to say along the lower surface 16 of each of the plates. According to the invention, the gas thus injected has a flow rate of about 0.05 to 10 m$^3$ per hour per linear meter of plate width, the gas possibly being injected continuously, discontinuously, periodically or randomly, with a constant or variable flow rate.

The plates 14 are characterized by three parameters: their width, their height and their thickness. The flow rate of injected gas per linear meter of plate applies to the width of these plates. This flow rate is independent of the height or of the thickness of the said plates, which means that this gas flow rate would be the same for a plate 0.5 meters or 3 meters in height, for example.

In the illustrative embodiment depicted in FIG. 1, the means for producing this gas-flushing operation are made in the form of a plurality of diffusers, such as 24, positioned under the filtration modules 14 at the bottom of the tank 12, these being fed with pressurized gas via a pipe 26.

Figure 2:
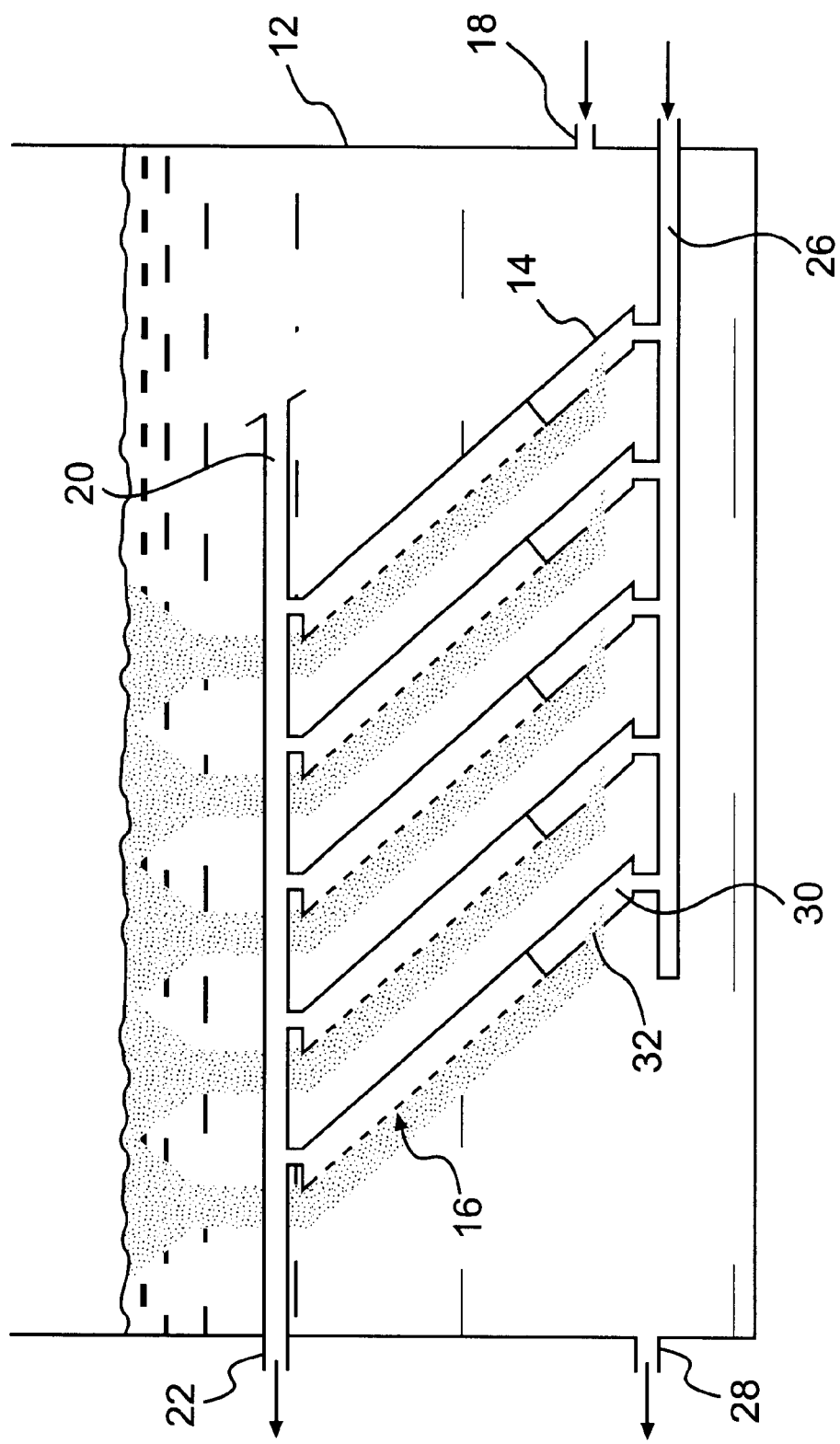
FIG. 2 is a schematic view similar to FIG. 1, depicting a second illustrative embodiment of the present invention.

The illustrative embodiment depicted in FIG. 2 is identical to that described above with reference to FIG. 1 except for the design of the means allowing the lower surface 16 of each inclined plate 14 to be flushed with gas. In this alternative embodiment, the diffusers are incorporated into the plates such as 14. These diffusers are therefore in the form of separate chambers such as 30, forming the bottom of each cavitied plate 14, these cavities being fed with gas via the pipe 26 and the gas bubbles being emitted via at least one opening such as 32 provided in each chamber such as 30, so that the gas bubbles flow away along the filter medium provided on the lower surface 16 of each plate.

In the present invention, the flushing gas may be air, oxygen, ozonized gas (thereby allowing aerobic treatments to be carried out in the separation plant 12) or an inert gas (thereby allowing anoxic treatments to be carried out in the tank 12).

It should be emphasized that the above-mentioned embodiment of this separation apparatus according to the present invention is advantageous given that the use of plates similar to the plates 14, described above, but placed vertically, would have a lower performance since, in order to guarantee contact between the gas bubbles and the filter medium, necessary for controlling the deposits or the said filter medium, it would be necessary:

to inject more gas;
to have fine control of the hydraulics in the liquid stream so as to avoid the formation of preferential flows; in the latter case, there would be the risk of subaerated regions forming that would rapidly clog up. Such operation would result in the process being heterogeneous and therefore resulting in a great reduction in its performance;
to limit the height of the plates in order to prevent the formation of filtrate recirculation currents from the compartments towards the mass of liquid to be filtered, the said recirculation currents being induced by differences in density between the bubble-laden, and therefore less dense, liquid and the degassed, and therefore more dense, filtrate.

The inclined arrangement of the filter plates 14 according to the present invention guarantees effective contact between the gas bubbles and the filter medium and offers the possibility, by varying the gas flow rate (continuously or in sequences), the size of the bubbles formed and the angle of inclination of the plates, of independently adjusting:

the rate of replenishment of the layer of material deposited on the filter medium;
the thickness of this layer, and therefore the filtration output and the rate of clogging.

Of course, it remains the case that the present invention is not limited to the embodiments described and/or mentioned above; on the contrary, it encompasses all alternative embodiments thereof.

What is claimed is:

1. An apparatus for the separation of a solid/liquid suspension by filtration, comprising:

a tank filled with a suspension to be treated;
at least one cavitied plate having at least one internal compartment, the plate being immersed in the suspension to be treated, said plate being inclined with respect to the vertical;
only a lower inclined face of the plate being covered with a filter medium, the upper face being solid;
the compartment of said cavitied plate communicating with a conduit which collects filtered suspension; and
gas flushing means positioned below said plate for emitting gas bubbles that pass across the filter medium and remove material clinging thereto.

2. The separation apparatus according to claim 1, further comprising a plurality of cavitied plates, each plate having at least one internal compartment.

3. The separation apparatus according to claim 2, wherein said plates are arranged parallel to each other.

4. The separation apparatus according to claim 2, wherein said plates are equidistant.

5. The separation apparatus according to claim 2, wherein said plates are separated from each other with a variable spacing.

6. The separation apparatus according to claim 2, wherein said plates are arranged with a spacing of 0.5 cm–20 cm.

7. The separation apparatus according to claim 1, wherein filtered suspension is recovered by a manifold located at the top of said at least one plate.

8. The separation apparatus according to claim 1, wherein the filtered suspension is recovered by a manifold located on a side of said at least one plate.

9. The separation apparatus according to claim 1, wherein the filtered suspension is recovered by a manifold located at a bottom of said at least one plate.

10. The separation apparatus according to claim 1, wherein said at least one plate is inclined at 5–60 degrees with respect to the vertical.

11. The separation apparatus according to claim 1, wherein said filter medium is a coarse medium having a pore size of 0.2 $\mu$m–100 $\mu$m.

12. The separation apparatus according to claim 1, wherein the gas flushing means comprise an array of diffusers placed beneath said at least one plate at a bottom of the tank, orifices of the gas flushing means emerging under the at least one plate, in the lower part of said tank.

13. The separation apparatus according to claim 1, wherein the gas flushing means includes a separate chamber that communicates with the lower part of a respective plate, the gas flushing means being fed with gas via a feed pipe, said chamber being provided with at least one discharge opening for the gas which is positioned so that gas bubbles flow past the filter medium.

14. The separation apparatus according to claim 1, wherein the gas for flushing the filter medium is selected from the group consisting of: air, oxygen and ozonized gas.

15. The separation apparatus according to claim 1, wherein the gas for flushing the filter medium is an inert gas.

16. The separation apparatus according to claim 1, wherein the gas flushing means creates a flow rate of the flushing gas per linear meter of plate width that is 0.05 m$^3$/h–10 m$^3$/h.

17. The separation apparatus according to claim 1, wherein the gas flushing means creates a variable injection flow rate of the flushing gas.

18. The separation apparatus according to claim 1, wherein the gas flushing means creates a constant injection flow rate of the flushing gas.

19. The separation apparatus according to claim 1, wherein the gas flushing means creates a periodic or random injection flow rate of the flushing gas.

20. The separation apparatus according to claim 1, wherein the gas flushing means creates a continuous injection flow rate of the flushing gas.

21. The separation apparatus according to claim 1, wherein the gas flushing means creates a discontinuous injection flow rate of the flushing gas.

22. The separation apparatus according to claim 1, wherein the gas flushing means creates a pressure of 10 Pa–$10^4$ Pa across the filter medium.

23. The separation apparatus according to claim 22, wherein the gas flushing means creates a pressure of approximately $10^2$ Pa across the filter medium.

* * * * *